United States Patent [19]

Mountz

[11] Patent Number: 4,711,325
[45] Date of Patent: Dec. 8, 1987

[54] WHEEL CHOCK ASSEMBLY

[75] Inventor: Craig E. Mountz, Wadsworth, Ill.

[73] Assignee: Ammco Tools, Inc., North Chicago, Ill.

[21] Appl. No.: 874,528

[22] Filed: Jun. 16, 1986

[51] Int. Cl.$^4$ .............................................. B60T 3/00
[52] U.S. Cl. .................................................... 188/32
[58] Field of Search ............................. 188/32, 36, 67

[56] References Cited

U.S. PATENT DOCUMENTS

| | | | |
|---|---|---|---|
| 1,046,145 | 12/1912 | Budesheim | 188/67 X |
| 1,138,195 | 5/1915 | Cox | 188/67 |
| 2,773,564 | 12/1956 | Garard | 188/32 |
| 3,581,846 | 6/1971 | Janus | 188/32 |

*Primary Examiner*—Duane A. Reger
*Attorney, Agent, or Firm*—Edmond T. Patnaude

[57] ABSTRACT

A wheel chock assembly for preventing movement of a wheel relative to the surface on which it is resting includes a pair of wedge members positionable in spaced apart relation one to another and interconnected by a bar. At one end, the bar is slidingly received by aperture means provided in a first wedge member, and at its other end it is fixedly attached to the second wedge member. A tab having an aperture is slidingly received by the bar and is disposed adjacent the first wedge member. Abutment of a portion of the tab against the first wedge member causes pivoting movement of the tab and locking engagement between an edge of the tab aperture and the bar, thereby preventing relative outward movement of the two wedge members.

5 Claims, 8 Drawing Figures

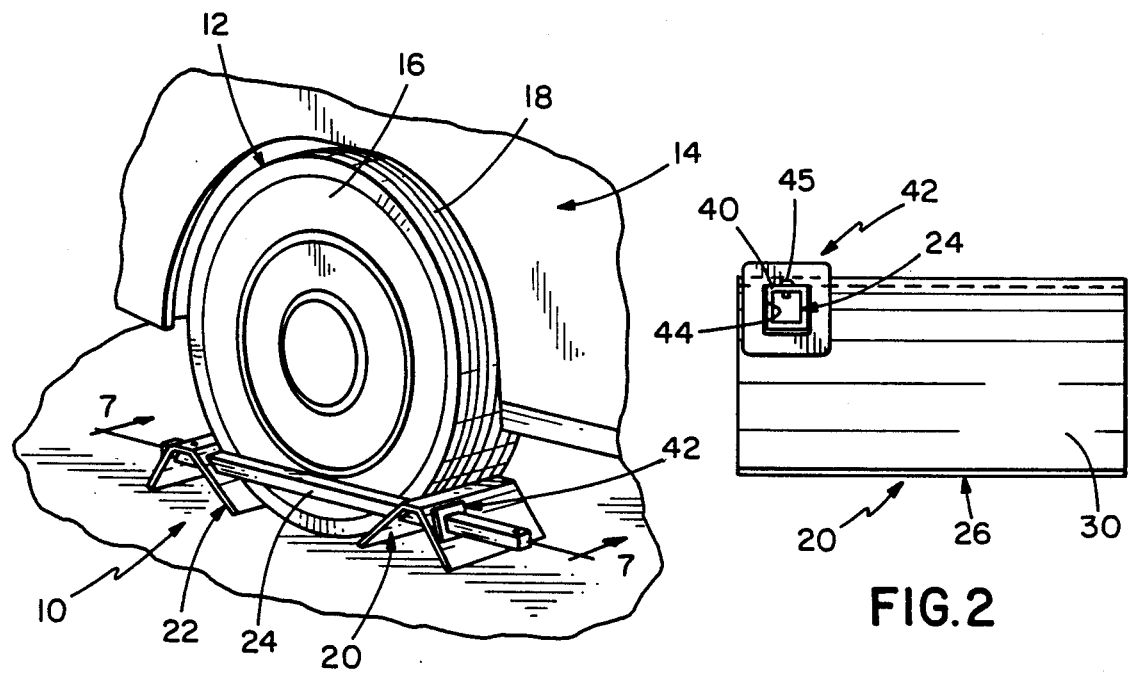
FIG.1
FIG.2
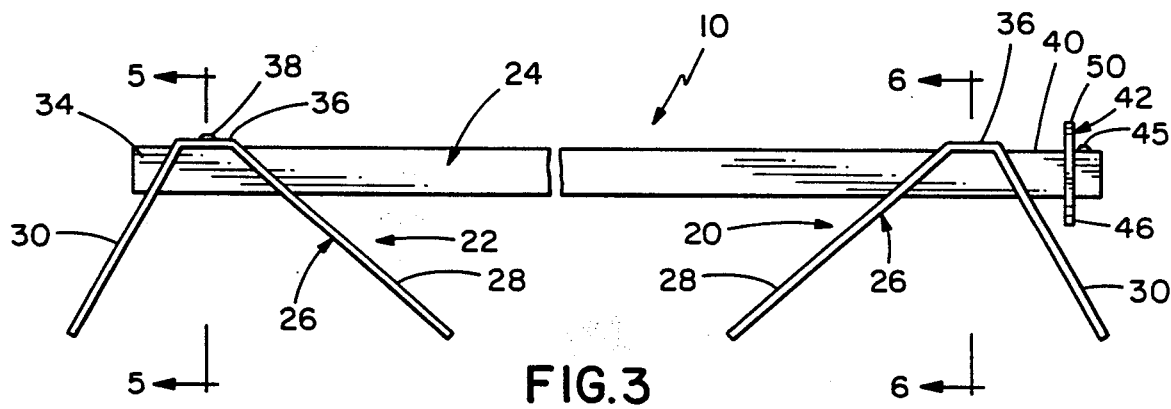
FIG.3
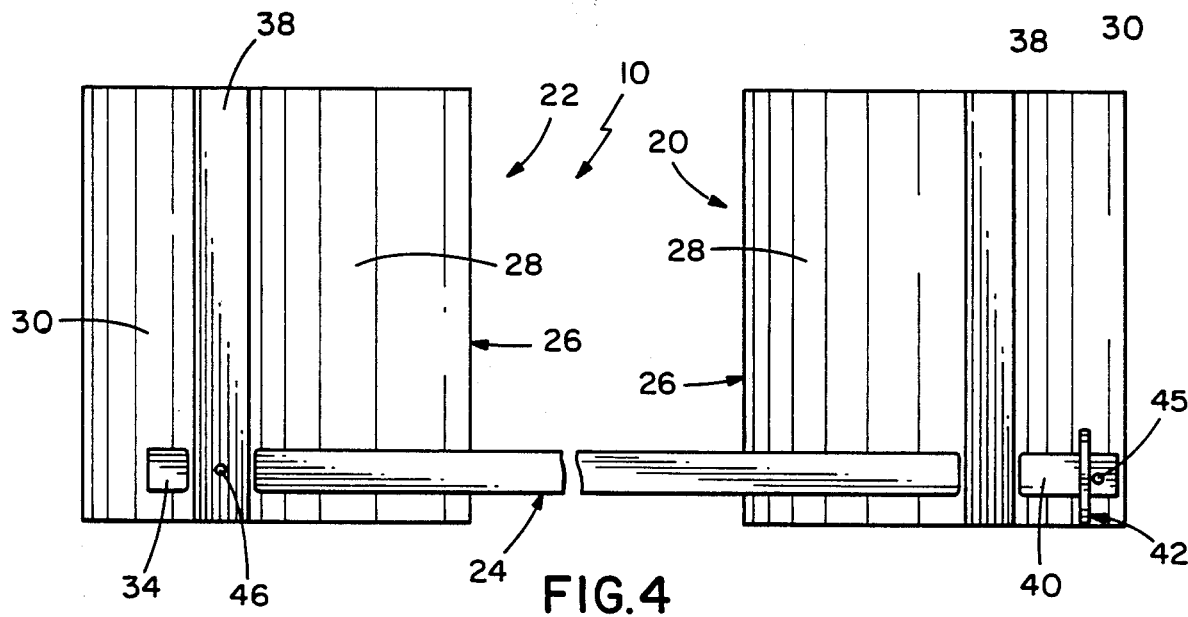
FIG.4

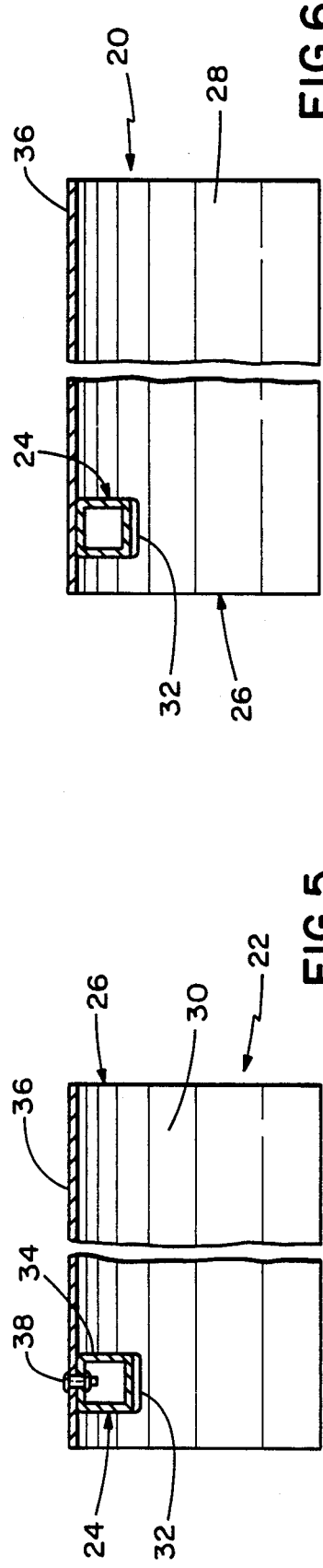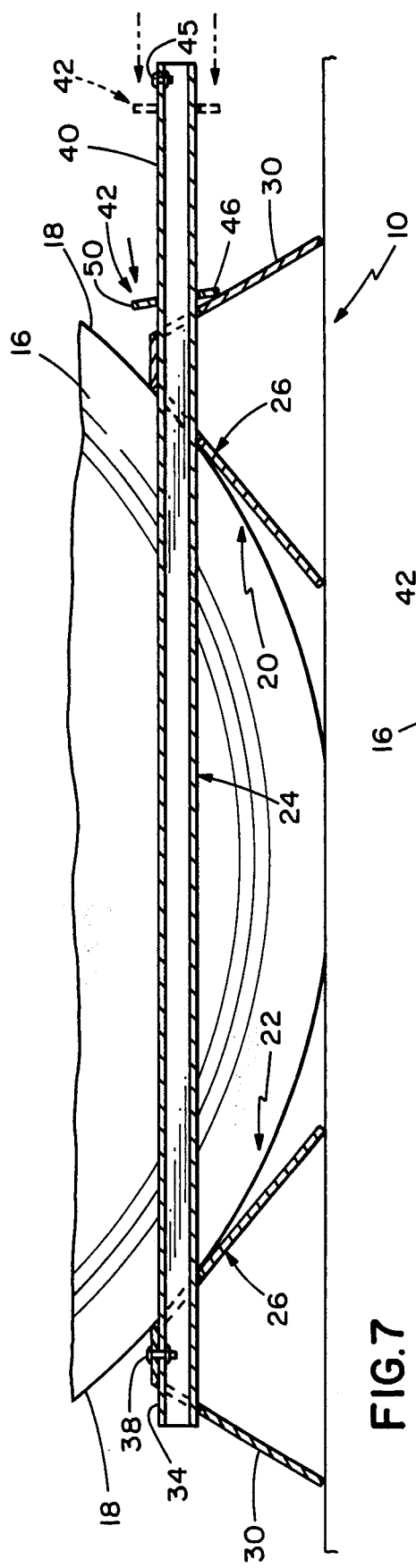

WHEEL CHOCK ASSEMBLY

BACKGROUND OF THE INVENTION

1. Field of the Invention

The present invention relates generally to an improved wheel chock assembly for preventing relative movement between a wheel and the ground or floor surface upon which the wheel is resting, and it relates more particularly to a new and improved means for coupling a pair of wheel chocks together such that the chocks cooperate to more positively prevent movement of the wheel and are more manageable to handle.

2. Description of the Prior Art

Wheel chocks are a well known tool in a variety of applications wherein it is necessary to insure that a vehicle or piece of equipment remains in a stationary position with respect to the ground or other surface upon which it is resting. In the servicing of aircraft or automobiles, for example, wheel chocks are frequently used in pairs, and comprise two wedge-like members which are manually positionable against the forward and rearward sides of the wheel tread. These wedge-like members may be constructed of wood or metal and are frequently interconnected by a strap in order to facilitate their handling and to ensure that they are used in pairs for maximum effectiveness.

A disadvantage of wheel chocks of the foregoing type resides in the fact that while an interconnecting strap assists in the manageability of the chocks, the chocks have complete freedom of movement with respect to one another, and hence, can be installed at virtually any angle with respect to the tread of the wheel intended to be rendered immovable. Moreover, because the chocks act independently of one another, after installation, one or both chocks can be jarred from its optimum position of effectiveness resulting in potential movement of the subject vehicle or equipment. Accordingly, it would be desirable to provide a chock assembly wherein a pair of chocks is maintained each in an optimum position with respect to the wheel and is firmly retained in such position against removal forces. In addition, it would be desirable to provide such an improved chock assembly having convenience of handling.

SUMMARY OF THE INVENTION

Briefly, there is provided in accordance with the teachings of the present invention a new and improved wheel chock assembly comprising a pair of wedge members positionable in spaced apart relation one to another and adapted to receive a wheel therebetween. A bar which is cooperable with the wedge members retains them in fixed disposition one to another. One of the wedge members is provided with means for slidingly receiving a first end of the bar, and means are positionable on the bar for preventing relative outward movement of the two wedge members. With such an assembly, the wedge members may be positioned against the forward and rearward surfaces, respectively, of the wheel tread and are maintained in such disposition against forces which might inadvertently cause the wedge members to otherwise be misaligned from their optimum position of effectiveness.

BRIEF DESCRIPTION OF THE DRAWINGS

The foregoing and other novel features of the present invention will be better understood by a reading of the following detailed description taken in connection with the accompanying drawings wherein:

FIG. 1 is a perspective view illustrating use of a wheel chock assembly constructed in accordance with the principles of the invention;

FIG. 2 is a right side elevational view of the wheel chock assembly illustrated in FIG. 1;

FIG. 3 is a front elevational view of the wheel chock assembly of the present invention;

FIG. 4 is a top plan view of the wheel chock assembly of the instant invention;

FIG. 5 is a sectional view taken along the lines 5—5 of FIG. 3;

FIG. 6 is a cross sectional view taken along the lines 6—6 of FIG. 3;

FIG. 7 is a cross sectional view taken along the lines 7—7 of FIG. 1 illustrating the manner in which the wheel chock assembly of the instant invention is locked into appropriate position to prevent a wheel from movement; and FIG. 8 is a partial cross sectional view similar to the view of FIG. 7 and illustrating the manner in which the wheel chock of the instant invention is unlocked for removal.

DETAILED DESCRIPTION OF THE INVENTION

Referring now to the drawings, and initially to FIG. 1, a wheel chock assembly in accordance with the invention and designated generally by the reference numeral 10 is shown in use with a wheel 12 of a vehicle 14, the wheel 12 being of a common type having a rubber tire 16 with a tread 18 along the peripheral surface thereof. Generally, the wheel chock assembly 10 includes as its principal components a pair of wedge members 20 and 22 together with an interconnecting bar 24.

Turning now to FIGS. 2, 3 and 4, the wedge members 20 and 22 can be seen to comprise a pair of generally V-shaped, fabricated members designated generally by the reference numeral 26, each formed into a wedge configuration such that a first plate portion 28 is movable into abutment with the tread 18 of the tire 16 and a second plate portion 30 serves essentially as a stand. The bar 24 is preferably a tubular member having a square cross section, and as best seen in FIGS. 5 and 6, its ends are slidingly receivable within rectangular apertures 32 provided in the plate portions 28 and 30 of the wedge members 20 and 22. One end 34 of the bar 24 is preferably secured to an upper surface 36 of wedge member 22 by a rivet 38, or the like. The other end 40 of the bar 24 passes freely through the apertures 32 of the surfaces 28 and 30 of wedge member 20.

In order to connect the two wedge members 20 and 22 in fixed disposition one to another, in accordance with the instant invention a tab 42 is slidably positionable on the second end 40 of the bar 24. As best seen in FIG. 2, the tab 42 has an overall rectangular configuration and includes a central aperture 44 having dimensions which are slightly larger than the outside dimensions of the bar 24, whereupon the tab 42 is free to slide axially of the bar 24 and to pivot slightly from a vertical orientation, as best seen in FIG. 7 for example. A rivet 45 is provided at the distal end 40 of the bar 24 to prevent removal of the tab 42 from the bar 24 after assembly.

Operation

The operation of the wheel chock assembly 10 as heretofore described can best be seen in the cross sectional views of FIGS. 7 and 8. The assembly 10 is first placed in proximity to the wheel 12 intended to be rendered immovable, and then it is moved laterally such that the wedge members 20 and 22 are each in position adjacent the tread 18 of the tire 16 aligned with the path of travel of the wheel 12. Wedge member 20 is then moved axially of the bar 24 until both wedge members 20 and 22 come into contact with the tire 16 by abutment of their surfaces 28 against the tread 18. Thus positioned, the wedge members 20 and 22 are capable of preventing any movement of the wheel 12 on the surface upon which it is resting.

In order to lock the wedge members 20 and 22 in their installed position against the tread 18 of the tire 16, the tab 42 is next moved axially of a bar 24 until a lower portion 46 of the tab 42 comes into abutment with the surface 30 of wedge member 20 whereupon further urging of the tab 42 axially of the bar 24 causes the tab 42 to pivot slightly from its normal vertical position. In such a disposition, edges 48 of the tab aperture 44 grip the bar 24 in such a manner that the tab 42 is locked onto the bar 24 and is thereby rendered incapable of axial movement away from the wheel 12. Should the wedge members 20 and 22 be urged apart by attempted movement of the wheel 12, or by some other transient force, the plate portion 30 of wedge member 22 would tend to further pivot the tab 42 causing the edges 48 of the tab aperture 44 to grip the bar 24 with increased force. When it is desired to remove the wheel chock assembly 10 from its installed position with respect to the wheel 12, as best seen in FIG. 8, an upper portion 50 of the tab 42 may be manually moved away from the wheel thereby causing the tab 42 to pivot to its normally vertical disposition releasing the grip of the edges 48 on the bar 24. The wedge members 20 and 22 can thereafter be separated and removed from beneath the tread 18 of the tire 16. In the event that the tab cannot be moved manually because it is firmly locked to the bar 24 under pressure of the wedge portion 30 against lower portion 46 of the tab 42, the wheel chock assembly 10 may simply be moved laterally of the wheel such that the wedge member 20 and 22 are free of the tire 16 and the pressure against the tab 42 is relieved.

It should now be appreciated that the wheel chock assembly 10 of the instant invention is convenient to handle inasmuch as the bar 24 and wedge members 20 and 22 can be constructed of a relatively lightweight, but strong, material such as aluminum, and the three major components of the assembly 10, namely, the wedge members 20 and 22 and bar 24 are all interconnected as a unit. In addition, since the bar 24 connects to the wedge members 20 and 22 by protruding through substantially spaced apart apertures 32 provided in the plate portions 28 and 30 of each wedge member 20 and 22, the wedge members 20 and 22 are maintained at all times in alignment with respect to one another and accordingly they always assume a disposition of optimum effectiveness with respect to the wheel 12 when the wheel chock assembly 10 is installed.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications as come within the true spirit and scope of this invention.

What is claimed as new and desired to be secured under Letters Patent of the United States is:

1. A wheel chock assembly comprising:
    a pair of wedge members positionable in spaced apart relation one to another to receive a wheel therebetween;
    a bar cooperable with said wedge members for retaining said wedge members in fixed disposition one to another;
    means associated with one of said wedge members for slidingly receiving a first end of said bar;
    means positionable on said bar for preventing relative outward movement of said wedge members;
    wherein a second end of said bar is fixedly attached to the second wedge member; and,
    wherein said means for preventing relative outward movement of said wedge members includes a movable tab having an aperture formed therein and said aperture is dimensioned to receive said bar.

2. The wheel chock assembly of claim 1 further comprising means for preventing removal of said tab from said bar.

3. The wheel chock assembly of claim 1 wherein the aperture of said tab defines an edge and said edge locks to said bar upon pivoting movement of said tab with respect to said bar.

4. The wheel chock assembly of claim 3 wherein abutment of a portion of said tab with said first wedge member causes said pivoting movement of said tab.

5. A wheel chock assembly comprising: a pair of wedge members positionable in spaced apart relation one to another to receive a wheel therebetween, said wedge members being interconnected by a bar, a first one of said wedge members having an aperture for slidingly receiving a first end of said bar to adjust the spacing of said wedge members, a second one of said wedge members being fixedly secured to a second end of said bar, a tab having an aperture for slidingly receiving said bar, said aperture defining an edge, and said tab being positionable near said first end of said bar adjacent said first wedge member, whereupon abutment of a portion of said tab against said first wedge member causes pivoting movement of said tab and locking engagement between said edge of said aperture and said bar thereby preventing relative outward movement of said wedge members.

* * * * *